(12) United States Patent
Frisch

(10) Patent No.: US 7,357,409 B2
(45) Date of Patent: Apr. 15, 2008

(54) GAS BAG MODULE

(75) Inventor: Ralph Frisch, Mömbris (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 294 days.

(21) Appl. No.: 10/958,052

(22) Filed: Oct. 4, 2004

(65) Prior Publication Data

US 2005/0093274 A1 May 5, 2005

(30) Foreign Application Priority Data

Oct. 29, 2003 (DE) .................. 203 16 601 U

(51) Int. Cl.
*B60R 21/20* (2006.01)
*B60R 21/203* (2006.01)
*B60R 21/215* (2006.01)
*H01H 9/00* (2006.01)

(52) U.S. Cl. .............. 280/728.3; 280/728.2; 280/731; 200/61.54; 200/61.55

(58) Field of Classification Search ............ 280/728.3, 280/731, 728.2; 200/61.54, 61.55
See application file for complete search history.

(56) References Cited

U.S. PATENT DOCUMENTS

| 5,542,694 A * | 8/1996 | Davis ................ 280/728.3 |
| 5,569,893 A * | 10/1996 | Seymour ............. 200/61.54 |
| 5,588,673 A * | 12/1996 | Green et al. ............ 280/731 |
| 5,590,902 A * | 1/1997 | Eckhout ............... 280/728.3 |
| 5,639,114 A * | 6/1997 | Margetak et al. ....... 280/728.3 |
| 5,685,561 A * | 11/1997 | Kauer ................ 280/731 |
| 5,973,283 A * | 10/1999 | Ariga et al. ............ 200/512 |
| 6,042,147 A * | 3/2000 | Nishijima et al. ....... 280/743.1 |
| 6,079,734 A * | 6/2000 | Porter ................ 280/728.3 |
| 6,155,594 A | 12/2000 | Ibe et al. |
| 6,431,584 B1 * | 8/2002 | Nagasawa et al. ....... 280/728.2 |
| 6,481,745 B2 * | 11/2002 | Ford ................ 280/731 |
| 6,517,100 B2 * | 2/2003 | Frisch ................ 280/728.2 |
| 6,561,538 B2 * | 5/2003 | Ford et al. ............ 280/728.2 |
| 6,786,504 B2 * | 9/2004 | Lorenz et al. .......... 280/728.2 |

(Continued)

FOREIGN PATENT DOCUMENTS

DE 10036759 2/2002

(Continued)

*Primary Examiner*—Paul N. Dickson
*Assistant Examiner*—Joselynn Y. Sliteris
(74) *Attorney, Agent, or Firm*—Tarolli, Sundheim, Covell & Tummino LLP

(57) ABSTRACT

A gas bag module (10) includes a gas bag (20) having a front wall. A center portion (24) of the front wall is fastened to the gas bag module (10) and prevented from a free movement in the case of deployment of the gas bag (20). The gas bag module further includes a covering cap (28) having a central portion (34), which is fastened by at least one fastening means to the gas bag module (10) so that the central portion (34) is prevented from a free movement upon deployment of the gas bag (20). The gas bag module (10) further includes at least first and second horn contacts (46, 48). The fastening means are designed so that the central portion (34) of the covering cap (28) can be moved by a predetermined first path ($d_1$) in a first direction ($A_1$) into the interior of the gas bag module (10), in order to form a contact between the first and second horn contacts (46, 48).

10 Claims, 1 Drawing Sheet

U.S. PATENT DOCUMENTS

| | | | |
|---|---|---|---|
| 6,802,528 B2 * | 10/2004 | Short et al. | 280/728.3 |
| 6,863,301 B2 * | 3/2005 | Ford et al. | 280/731 |
| 2002/0105171 A1 * | 8/2002 | Fellhauer et al. | 280/728.2 |
| 2004/0007854 A1 * | 1/2004 | Webber et al. | 280/728.2 |
| 2004/0041371 A1 * | 3/2004 | Webber et al. | 280/728.2 |
| 2004/0135351 A1 * | 7/2004 | Keutz et al. | 280/728.2 |
| 2004/0256840 A1 * | 12/2004 | Lutter et al. | 280/728.3 |
| 2005/0116452 A1 * | 6/2005 | Lee | 280/731 |
| 2005/0146119 A1 * | 7/2005 | Ford et al. | 280/731 |
| 2006/0028002 A1 * | 2/2006 | Tsujimoto et al. | 280/731 |
| 2006/0125217 A1 * | 6/2006 | Nakamura et al. | 280/731 |

FOREIGN PATENT DOCUMENTS

| | | |
|---|---|---|
| DE | 10203960 C1 * | 7/2003 |
| GB | 2384211 | 7/2003 |

* cited by examiner

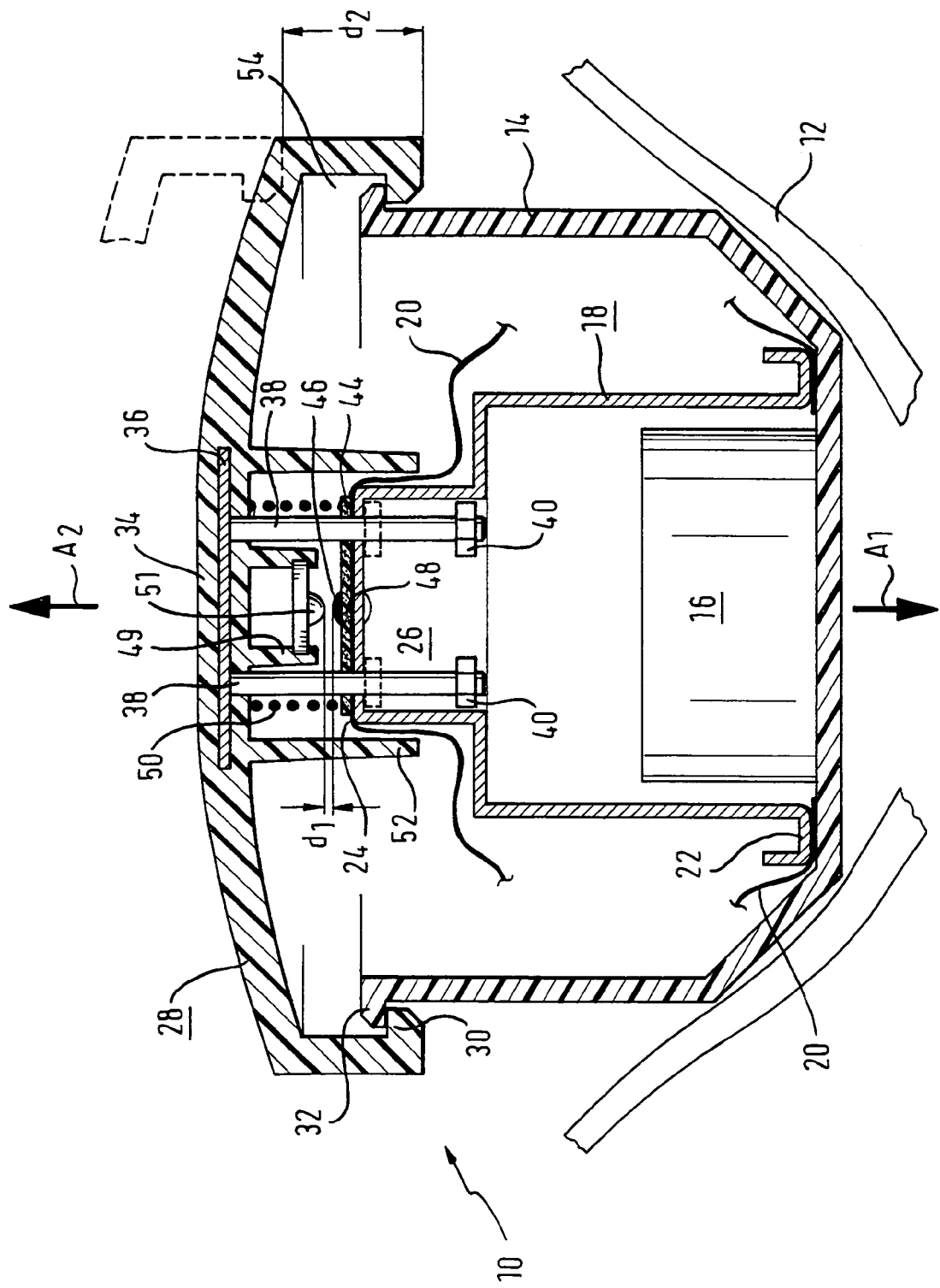

GAS BAG MODULE

TECHNICAL FIELD

The invention relates to a gas bag module, in particular to a gas bag module comprising a gas bag having a front wall, a center portion of the front wall being fastened to the gas bag module and being prevented from a free movement in the case of an unfolding of the gas bag.

BACKGROUND OF THE INVENTION

In such known gas bag modules, the gas bag unfolds through a ring-shaped outlet opening, when the gas bag module is activated.

It is an object of the invention to provide a simple and favourably-priced possibility to integrate a horn function and also to ensure a quick and reliable unfolding of the gas bag.

SUMMARY OF THE INVENTION

A gas bag module according to the invention comprises a gas bag having a front wall. A center portion of the front wall is fastened to the gas bag module and prevented from a free movement upon deployment of the gas bag. The gas bag module according to the invention further comprises a covering cap having a central portion, which is fastened by at least one fastening means to the gas bag module so that the central portion is prevented from a free movement upon deployment of the gas bag. The gas bag module according to the invention further comprises at least first and second horn contacts. The fastening means are designed so that the central portion of the covering cap can be moved by a predetermined first path in a first direction into the interior of the gas bag module, in order to form a contact between the first and second horn contacts.

The central portion of the covering cap is held back on the gas bag module during deployment of the gas bag. However, the central portion of the covering cap, in accordance with the invention, is fastened so that it can be displaced by a predetermined path into the steering wheel in which the gas bag module is held. Thereby, the two horn contacts come into contact and can close a signal current circuit to generate a horn signal.

Preferably the covering cap is fastened to the gas bag module so that the entire covering cap can be moved in the first direction. The cap is then advantageously so rigid that a pressure on a point on the covering cap causes a movement of the entire cap in the first direction.

Alternatively, however, it is also conceivable to construct particular portions of the cap to be so elastic that they can be pressed into the gas bag module, in order to close the horn contacts, without movement of the remaining portion of the cap.

The horn contacts can be formed on a contact foil in a spacing-saving manner and at a favourable cost.

In the gas bag module, preferably a diffusor and a gas generator arranged below the diffusor are provided, at least one of the horn contacts being arranged at an end of the diffusor facing the covering cap. In this case, the use of a contact foil is well suited for realizing the horn contacts.

In a preferred embodiment, the fastening means is designed so that upon deployment of the gas bag, the central portion of the covering cap can move in a second direction, which is opposite to the first direction, by a predetermined second path, so that the covering cap frees an outlet opening for the gas bag. Here, preferably, upon deployment of the gas bag the entire covering cap is lifted.

Preferably the first path is shorter than the second path, because to close the horn contacts a distinctly shorter distance has to be provided than for providing an outlet opening for the gas bag.

In this embodiment, the covering cap can be so rigid that it is only deformed slightly or not at all while the gas bag emerges upon deployment.

Alternatively, it is also possible for example to provide nominal fracture sites or hinges in a well-known manner known around the central portion of the covering cap. Along the fracture sites or hinges other portions of the covering cap are separated from the central portion or flap open towards it, in order to free the outlet opening for the gas bag.

Advantageously, the fastening means connects the central portion of the covering cap with an end of a diffusor facing the covering cap. Here, the fastening means can comprise at least one pin fastened to the covering cap, the pin having a stop which delimits a movement of the pin relative to the end of the diffusor facing the covering cap. Through such an arrangement, both the first and also the second path can be set in a suitable manner.

For example, a rigid insert can be provided in the central portion of the covering cap, and the pin can be fastened to the insert. Thus, the tensile stress upon deployment of the gas bag can be reliably transferred from the covering cap to the diffusor and hence to the steering wheel. Also, other suitable types of fastening means are conceivable.

In order to close the gas bag module to the exterior, it is possible to attach the covering cap on a module housing by means of a snap-on connection. The connection preferably opens upon deployment of the gas bag, in order to free an outlet opening for the gas bag. The outlet opening in this case can have for example a ring shape between an edge of the covering cap and an edge of the module housing.

BRIEF DESCRIPTION OF THE DRAWINGS

Further features and advantages of the invention will be apparent from the following description in connection with the accompanying drawing. The single FIGURE of the drawing diagrammatically shows a portion through a gas bag module according to the invention, which is inserted into a steering wheel.

The gas bag module 10 is held in the hub region of a steering wheel 12 which is indicated in a stylized manner.

In a module housing 14 or in a generator carrier, a gas generator 16 is fastened, which is arranged below a diffusor 18. The diffusor 18 is a cage or box of a suitable material, provided with outflow openings, through which the gas released by the gas generator 16 flows into a gas bag 20, held folded in the module housing 14 before the activation of the gas bag module 10.

An edge of an inflation opening of the gas bag 20 is secured at a lower end of the diffusor 18 which is directed towards the steering wheel, by means of a gas bag holding ring 22 which is constructed in one piece on the diffusor 18. The diffusor 18 is securely connected with the module housing 14 by means of the gas bag holding ring 22. A center portion 24 of a front wall of the gas bag 20, which extends in the inflated state in the direction of the vehicle occupant, is securely fastened on an upper end 26 of the diffusor 18 facing the covering cap 28. Consequently, the inflated gas bag 20 has an indentation in the center of its front wall, so that the gas bag 20, when inflated, assumes a ring-shaped form. Through a corresponding construction, which is not shown here but is familiar to the artisan, provision is made that the opening of the indentation is kept so small that no part of the vehicle occupant's body can penetrate therein inadvertently.

The gas bag module 10 is closed to the exterior, i.e. in a direction towards the interior of the vehicle with respect to the installed state, by a covering cap 28. The covering cap 28 is fastened to the housing 14 at its edge by means of a detent connection which comprises first detent elements 30 arranged on the covering cap 28 and second detent elements 32 arranged on the edge of the housing 14. The detent elements 30, 32 can be formed for example by surrounding strips formed on the covering cap 28 or on the module housing 14. The detent connection 30, 32 is designed so that it opens upon deployment of the gas bag 20.

A central portion 34 of the covering cap 28, which is located above the diffusor 18, is reinforced with a rigid metal insert 36, from which two pins 38 project. The pins 38 can be formed in one piece with the inserter 36 or can be connected therewith in another suitable manner.

The pins 38 project through openings provided into the end 26 of the diffusor 18 facing the covering cap and are respectively provided with a stop 40 in the form of a nut at their end lying inside the diffusor 18. The size of the openings at the upper end of the diffusor 18 is selected so that the stops 40 can not pass the openings.

Each of the pins 38 together with the corresponding stop 40 acts as a fastening means, by which the central portion 34 of the covering cap 28 is fastened securely to the diffusor 18 and hence to the gas bag module 10 and the steering wheel 12.

The stops 40 are arranged so that the pins 38 have a certain play both in a first direction $A_1$, which is directed into the gas bag module 10, and also in a second direction $A_2$, which is opposite to the first direction $A_1$. The directions $A_1$, $A_2$ lie parallel to an axis of the gas bag module 10 or of the gas generator 16.

In the example shown, the covering cap 28 is so rigid that the entire covering cap 28 can be moved by a first path $d_1$ along the first direction $A_1$ towards the interior of the gas bag module 10. This displacement serves to generate a horn signal.

For this, on an upper side of the upper end 26 of the diffusor 18 a contact foil 44 is fastened, on which first and second horn contacts 46, 48 are formed. The contact foil 44 may be constructed, for example, in the form of a known foil switch.

On the lower side of the central portion 34 of the covering cap 28, directed towards the interior of the gas bag module 10, a tubular element 49 projects. A plate provided with a projection 51 is fastened in the tubular element 49. In the mounted gas bag module 10, the projection 51 is located at a distance $d_1$ from the contact foil 44.

If the covering cap 28 is now moved by pressure applied onto the upper side thereof by the path $d_1$ in the first direction $A_1$, the projection 51 exerts pressure onto the contact foil 44, whereby the horn contacts 46, 48 come in contact with each other.

Between the upper end 26 of the diffusor 18 and the lower side of the central portion 34 of the covering cap 28, a restoring spring 50 is arranged, which makes provision that the projection 51 normally does not act on the contact foil 44.

On the lower side of the covering cap 28, in addition a tubular guide 52 is formed, which is adapted in diameter and length so that it embraces the upper end 26 of the diffusor 18 and thus offers a guide for the covering cap 28 on actuation of the horn.

Upon activation of the gas bag module 10, the gas generator 16 releases gas which is under pressure. The gas flows into the gas bag 20 through outflow openings (not shown) provided in the diffusor 18. Owing to the pressure building up in the gas bag 20, which also acts on the lower side of the covering cap 28, the detent connection 30, 32 is released and the entire covering cap 28 is lifted by a second path $d_2$ in the second direction $A_2$. Through the lifting of the covering cap 28, a ring-shaped outlet opening 54 is freed at the edge of the covering cap 28, through which the gas bag 20 unfolds.

The movement of the covering cap 28 is delimited in that the stops 40 at the ends of the pins 38 come into abutment against the upper end 26 of the diffusor 18. The end position of the stops 40 and also of the covering cap 28 (illustrated diagrammatically on one side) is shown in dashed lines.

Both the center portion 24 of the front wall of the gas bag 20 and also the central portion 34 of the covering cap 28 are prevented from a free movement. However, the central portion 34 is able to be move both in the first and also in the second direction $A_1$, $A_2$, respectively, by a certain predetermined path $d_1$, $d_2$. However, it is ensured that the central portion 34 of the covering cap 28 does not detach completely from the gas bag module 10 during the unfolding of the gas bag 20.

The horn contacts could also be arranged at a different location in the gas bag module, where they can be brought into contact with each other by pressing down the covering cap by the path $d_1$. Of course, the horn contacts can also be realized differently than in the form of a contact foil or a foil switch.

The detent connection 30, 32 is designed so that the covering cap can be displaced at least by the path $d_1$ in the first direction $A_1$, without the detent connection 30, 32 being permanently released.

The insert 36 can be injected or cast into the covering cap 28. Also, the tubular element 49 and also the guide 52 can be injected or cast in one piece onto the covering cap 28.

It is also possible to construct the covering cap 28 so that portions located around the central portion 34 detach themselves therefrom or fold towards it, in order to free an outlet opening for the gas bag 20.

The invention claimed is:

1. A gas bag module, comprising:
   a module housing (14);
   a gas bag (20) having a front wall, a center portion (24) of the front wall being fastened to the gas bag module (10) and being prevented from a free movement in the case of deployment of the gas bag (20);
   a covering cap (28) having a central portion (34), which is fastened by at least one fastening means to the gas bag module (10) 50 that the central portion (34) is prevented from a free movement upon deployment of the gas bag (20);
   a diffuser (18) being securely connected with the module housing (14);
   a gas generator (16) arranged below the diffuser (18);
   at least first and second horn contacts (46, 48), at least one of the horn contacts (46, 48) being arranged on an end (26) of the diffuser (18) facing the covering cap (28);
   the central portion (34) of the covering cap (28) being movable in opposite directions ($A_1$, $A_2$) in a mounted state of the gas bag module (10);

the fastening means being designed so that upon application of pressure onto an upper side of the central portion (34) of the covering cap (28) the central portion (34) of the covering cap (28) can be moved by a predetermined first path ($d_1$) in a first direction ($A_1$) into an interior of the gas bag module (10), in order to form a contact between the first and second horn contacts (46, 48); and the fastening means further being designed so that upon deployment of the gas bag (20) the central portion (34) of the covering cap (28) can move relative to the diffuser (18) in a second direction ($A_2$), opposite to the first direction ($A_1$), by a predetermined second path ($d_2$), so that the covering cap (28) frees an outlet opening (54) for the gas bag.

2. The gas bag module according to claim 1, wherein the covering cap (28) is fastened to the gas bag module (10) so that the entire covering cap (28) can be moved in the first direction ($A_1$).

3. The gas bag module according to claim 1, wherein the horn contacts (46, 48) are formed on a contact foil (44).

4. The gas bag module according to claim 1, wherein the entire covering cap (28) is in one piece and lifted upon deployment of the gas bag (20).

5. The gas bag module according to claim 1, wherein the first path ($d_1$) is shorter than the second path ($d_2$).

6. The gas bag module according to claim 1, wherein the fastening means connects the central portion (34) of the covering cap (28) with an end (26) of a diffuser (18) facing the covering cap (28).

7. The gas bag module according to claim 6, wherein the fastening means comprises at least one pin (38) fastened to the covering cap (28), the pin (38) having a stop (40) which delimits a movement of the pin (38) relative to the end (26) of the diffuser (18) facing the covering cap (28).

8. The gas bag module according to claim 7, wherein a rigid insert (36) is provided in the central portion (34) of the covering cap (28) and the pin (38) is fastened to the insert (36).

9. The gas bag module according to claim 8, wherein the insert (36) is made of metal.

10. The gas bag module according to claim 1, wherein the covering cap (28) is attached to said module housing (14) by a snap-on connection.

* * * * *